US007357545B2

(12) United States Patent
Stefka et al.

(10) Patent No.: US 7,357,545 B2
(45) Date of Patent: Apr. 15, 2008

(54) MULTI-FOCAL LENS FOR BI-FUNCTIONAL HEADLAMP

(75) Inventors: Jan Stefka, Novy Jicin (CZ); Marek Olivik, Prerov (CZ); David Hynar, Studenka (CZ); Tomas Kreml, Ostrava (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 219 days.

(21) Appl. No.: 11/200,637

(22) Filed: Aug. 10, 2005

(65) Prior Publication Data

US 2007/0035961 A1 Feb. 15, 2007

(51) Int. Cl.
*B60Q 1/00* (2006.01)

(52) U.S. Cl. ...................... 362/539; 362/332; 362/521; 362/522; 362/520

(58) Field of Classification Search ..................... None
See application file for complete search history.

(56) References Cited

U.S. PATENT DOCUMENTS

| | | | | |
|---|---|---|---|---|
| 1,422,307 | A | | 7/1922 | Salto |
| 1,901,012 | A | | 3/1933 | Tourriol |
| 2,241,128 | A | | 5/1941 | Harley |
| 2,283,598 | A | | 5/1942 | Decalion |
| 2,760,051 | A | | 8/1956 | Schmidt |
| 4,562,519 | A | | 12/1985 | Deves |
| 4,879,636 | A | | 11/1989 | Yamagishi et al. |
| 4,918,580 | A | | 4/1990 | Nino |
| 5,083,245 | A | | 1/1992 | Fray et al. |
| 5,305,189 | A | | 4/1994 | Sekiguchi |
| 5,331,520 | A | | 7/1994 | Cejnek |
| 5,400,226 | A | | 3/1995 | Hogrefe |
| 5,436,807 | A | | 7/1995 | Kobayashi |
| 5,550,716 | A | | 8/1996 | Dassanayake et al. |
| 5,562,335 | A | | 10/1996 | Okuchi et al. |
| 5,574,328 | A | | 11/1996 | Okuchi |
| 5,660,454 | A | | 8/1997 | Mori et al. |
| 5,730,519 | A | | 3/1998 | Okuchi et al. |
| 5,779,341 | A | | 7/1998 | Chinniah et al. |
| 5,791,759 | A | * | 8/1998 | Dassanayake et al. ...... 362/496 |
| 6,059,435 | A | * | 5/2000 | Hamm et al. ............... 362/514 |
| 6,109,772 | A | * | 8/2000 | Futami et al. .............. 362/517 |

(Continued)

FOREIGN PATENT DOCUMENTS

| | | |
|---|---|---|
| EP | 0 738 904 B1 | 11/2001 |

*Primary Examiner*—Sharon E. Payne
*Assistant Examiner*—Kristen A Manskar
(74) *Attorney, Agent, or Firm*—Brinks Hofer Gilson & Lione

(57) ABSTRACT

The headlamp assembly having low beam and high beam operation modes includes a light source, a reflector surface adapted to reflect light from the light source outward to a condenser lens positioned at a distance from the light source. An opaque shield is positioned between the light source and the condenser lens and is moveable between a first position, where a portion of the reflected light is blocked from reaching the condenser lens, and a second position, where substantially all of the reflected light is allowed to reach the condenser lens. The condenser lens has a first segment and a second segment wherein, when the opaque shield is in the first position, light is reflected almost entirely to the first segment of the condenser lens, and when the opaque shield is in the second position, light is reflected to the first and second segments of the condenser lens.

12 Claims, 3 Drawing Sheets

U.S. PATENT DOCUMENTS 6,280,067 B1 * 8/2001 Albou ........................ 362/459
6,280,071 B1 * 8/2001 Yamamoto et al. ......... 362/539
6,312,147 B2 * 11/2001 Eichler ....................... 362/539
6,354,721 B1 3/2002 Zattoni
6,543,910 B2 * 4/2003 Taniuchi et al. ............ 362/297
6,619,827 B2 * 9/2003 Uchida ....................... 362/539
6,827,473 B2 12/2004 Kobayashi
7,021,804 B2 * 4/2006 Van Duyn .................. 362/516
2002/0186565 A1 12/2002 Taniuchi et al.
2004/0264210 A1 12/2004 Albou et al.
2005/0030759 A1 2/2005 Zollers

* cited by examiner

MULTI-FOCAL LENS FOR BI-FUNCTIONAL HEADLAMP

BACKGROUND

1. Field of the Invention

The invention generally relates to a headlamp assembly having low beam and high beam operation modes and a multi-focal condenser lens.

2. Background of the Invention

Many projector headlamp units have two functions—low beam and high beam. Referring to FIG. 1, a prior art headlamp assembly is generally shown at 10. The headlamp assembly 10 includes a light source 12, a reflector surface 14, and a condenser lens 16. Switching between high beam and low beam is done by a movable shield 18. The shield 18 is moveable between a first position, shown in solid lines, and a second position, shown in dashed lines. In the first position, the shield 18 stops the light 20 reflecting from certain portions of the reflector surface 14 so that this light 20 cannot hit and pass through the condenser lens 16. Thus, the shield 18 creates the cutoff line of the low beam. In the second position, the shield 18 is moved out of the way and allows this light 20 reflecting from the reflector surface 14 to come over the shield 18 to the condenser lens 16 to provide a high beam function.

The problem associated with this type of headlamp is the need to achieve an ideal balance between low and high beam according to photometrical regulations. Regulations require that the high beam meet minimal values and the low beam meet maximal values within measurement points laying very closely to one to another.

There are two current solutions to this problem. The first one uses an optical design of the reflector surface to create an extreme gradient between the high beam and low beam regulation points. The second current solution is illustrated in FIG. 2. In FIG. 2, a headlamp assembly 110 includes a light source 112, a reflector surface 114, a condenser lens 116, and a shield 118. The shield 118 includes a first portion 118*a* and a second portion 118*b*. The second portion 118*b* is spaced from the first portion 118*a* at a distance in front of the first portion 118*a*. The second portion 118*b* of the shield 118 decreases the intensity closely below the low beam cutoff, such that the low beam meets the maximal requirements.

These solutions meet the maximal and minimal requirements for low beam and high beam operation, but only by a small margin. Therefore, there is a need for a headlamp assembly that provides an optimal balance between the low beam and high beam operation, such that both the low beam and high beam have good intensity values that meet the maximal and minimal requirements.

SUMMARY

A headlamp assembly having low beam and high beam operation modes, in accordance with the present invention includes a light source, a reflector surface adapted to reflect light from the light source outward, a condenser lens positioned at a distance from the light source such that light from the light source hits the reflector surface and is reflected outward to the condenser lens, the condenser lens adapted to focus the light passing therethrough, and an opaque shield positioned between the light source and the condenser lens, the opaque shield being moveable between a first position, where a portion of the light reflected from the reflector surface is blocked from reaching the condenser lens, and a second position, where substantially all of the light reflected by the reflector surface is allowed to reach the condenser lens.

In one aspect, the condenser lens has a first half and a second half wherein, when the opaque shield is in the first position, light from the light source is reflected only to the first half of the condenser lens, and when the opaque shield is in the second position, light from the light source is reflected to the first and second halves of the condenser lens.

In another aspect, the first half of the condenser lens is a lower hemi-spherical portion and the second half of the condenser lens is an upper hemi-spherical portion, wherein the first half of the condenser lens has a first focal point and the second half of the condenser lens has a second focal point, the first and second focal points being located on a central axis of the headlamp assembly, between the light source and the condenser lens, the second focal point being located closer to the lens than the first focal point.

In still another aspect, the shield, when in the first position, and the first focal point are located at the same distance from the light source, such that when in the first position, the opaque shield only allows light above the first focal point to pass through to the condenser lens, thereby creating a low beam cut off.

In yet another aspect, when the opaque shield is in the first position, light passing through the first half of the condenser lens does not pass through the first focal point, and therefore is not collimated, and when the opaque shield is in the second position, light reflected from the reflector passes through the second focal point to the second half of the condenser lens and is collimated, thereby creating a high intensity high beam.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
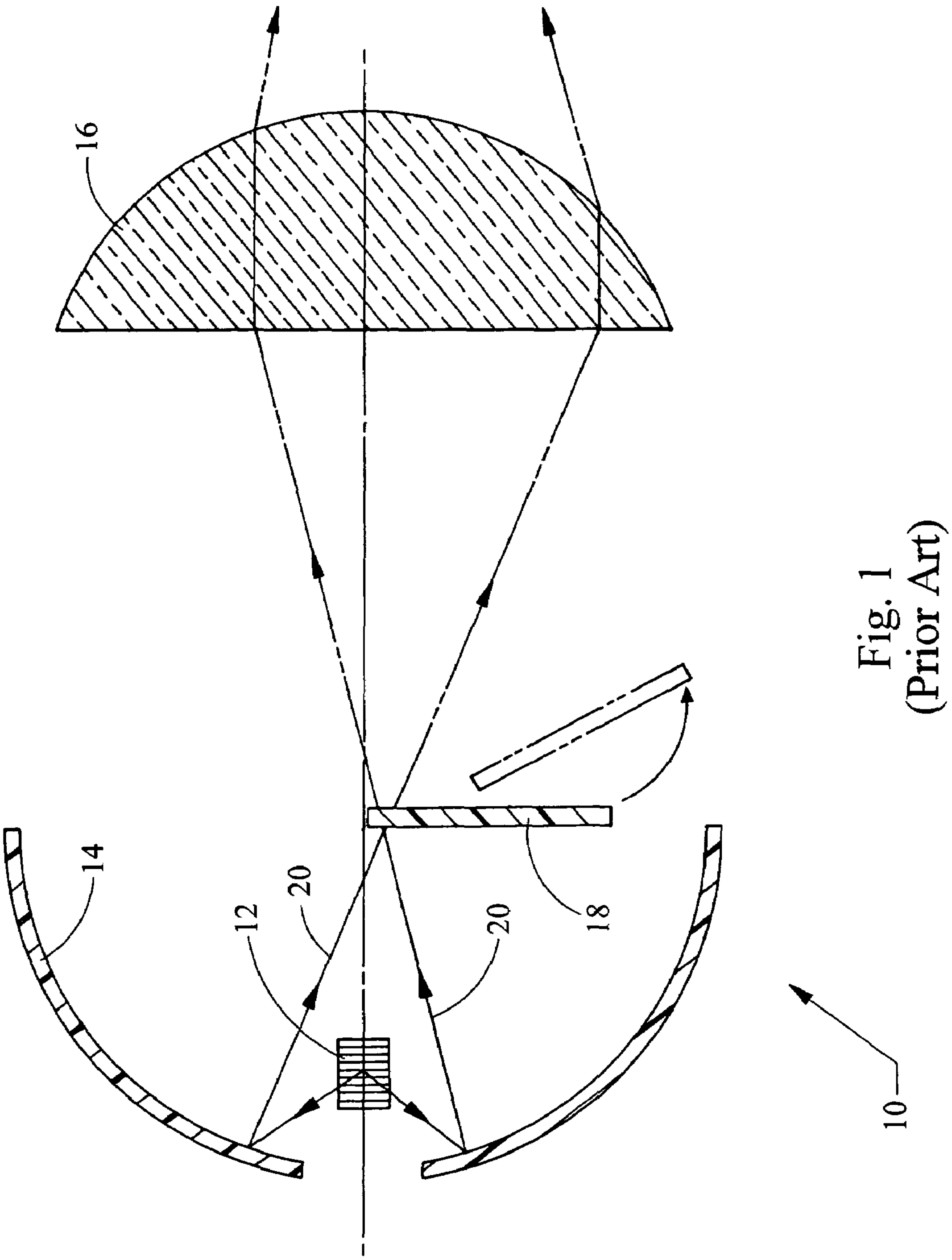
Fig. 1 (Prior Art)
FIG. 1 is a side sectional view of a prior art headlamp assembly having a movable shield.
Figure 2:
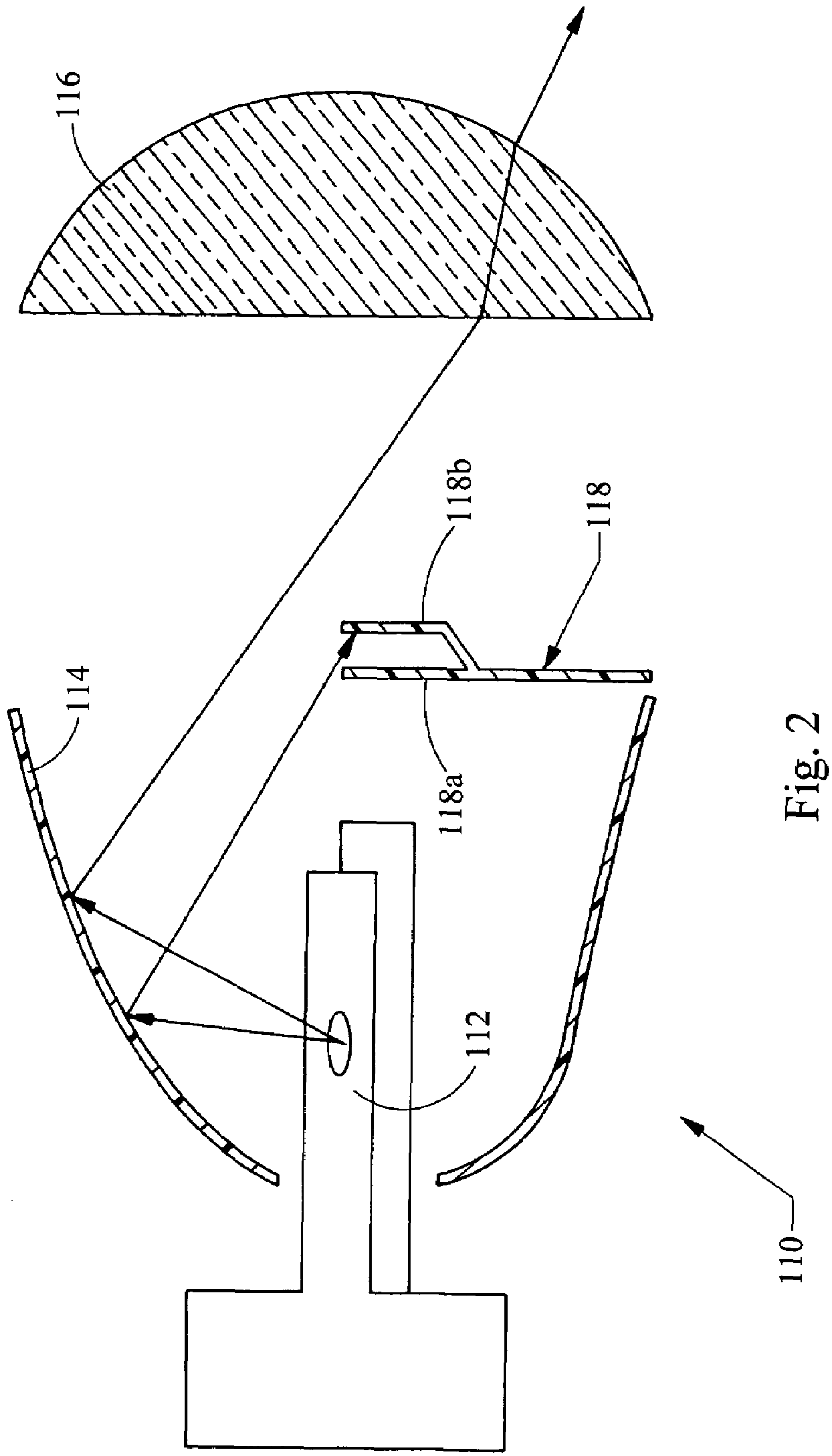
Fig. 2 (Prior Art)
FIG. 2 is a side sectional view of a prior art headlamp assembly having a moveable shield having first and second portions.
Figure 3:
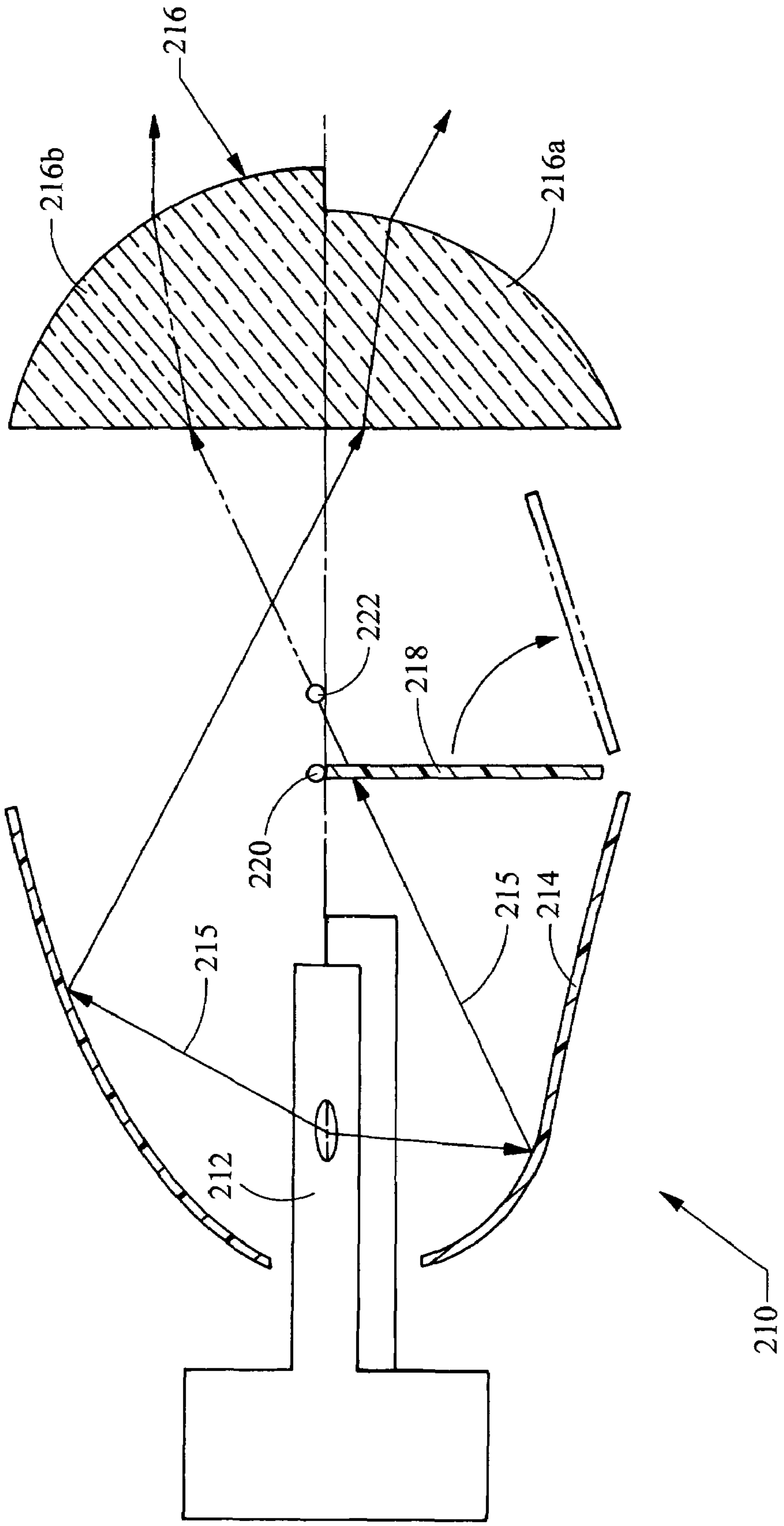
FIG. 3 is a side sectional view of a headlamp assembly of the present invention.

Referring to FIG. 3, a headlamp assembly in accordance with the present application is shown generally at 210. The headlamp assembly 210 provides both low beam and high beam operation modes and includes a light source 212, a reflector surface 214 adapted to reflect light from the light source outward, as indicated by arrows 215. The light source 212 can be any appropriate light source 212 for use with an automotive headlamp assembly, such as a halogen bulb or HID bulb. A condenser lens 216 is positioned at a distance from the light source 212 such that light 215 from the light source 212 hits the reflector surface 214 and is reflected outward to the condenser lens 216. The condenser lens 216 is adapted to collimate the light 215 passing therethrough.

An opaque shield 218 is positioned between the light source 212 and the condenser lens 216. The shield 218 is moveable between a first position and a second position. In the first position, a portion of the light 215 reflected from the reflector surface 214 is blocked from reaching the condenser lens 216. The first position of the shield 218 is shown in solid lines in FIG. 3. In the second position, substantially all of the light 215 reflected by the reflector surface 214 is allowed to reach the condenser lens 216. The second position of the shield 218 is shown in dashed lines in FIG. 3.

The condenser lens 216 has a first segment 216*a* and a second segment 216*b*. When the opaque shield 218 is in the first position, light 215 from the light source 212 is reflected almost entirely to the first segment 216*a* of the condenser lens 216. When the opaque shield 218 is in the second position, light 215 from the light source 212 is reflected to the first and second segments 216*a*, 216*b* of the condenser lens 216. As shown, the first segment 216*a* of the condenser lens 216 is a lower hemi-spherical portion and the second segment 216*b* of the condenser lens 216 is an upper hemi-spherical portion.

The first segment 216*a* of the condenser lens 216 has a first focal point 220 and the second segment 216*b* of the condenser lens 216 has a second focal point 222. The first and second focal points 220, 222 are located proximal to a central axis 224 of the headlamp assembly 210, between the light source 212 and the condenser lens 216. The second focal point 222 is positioned closer to the condenser lens 216 than the first focal point 220.

When the opaque shield 218 is in the first position, the opaque shield 218 and the first focal point 220 are located at the same distance from the light source 212. Because of this, when the opaque shield 218 is in the first position, the opaque shield 218 only allows light 215 above the first focal point 220 to pass through to the condenser lens 216, thereby creating a low beam cut off. Because the light 215 passing to the condenser lens 216 does not pass through the first focal point 220, the light is not collimated, and produces a low intensity light. The light is more diffuse and creates a lower intensity beam that meets the maximal requirements for low beam.

However, when the opaque shield 218 is in the second position, light 215 reflected from the reflector surface 214 passes through the second focal point 222 to the second segment 216*b* of the condenser lens 216. This light 215 is collimated, and produces a higher intensity high beam. That is, the light 215 is projected in a parallel pattern through the condenser lens 216. The light is concentrated in the forward direction, creating a high intensity beam that meets the minimal requirement for a high beam light.

In accordance with the provisions of the patent statutes, the present invention has been described in what is considered to represent its preferred embodiment. However, it should be noted that the invention can be practiced otherwise than as specifically illustrated and described.

What is claimed is:

1. A headlamp assembly having low beam and high beam operation modes comprising:

a light source;

a reflector surface adapted to reflect light from the light source outward;

a condenser lens positioned at a distance from the light source such that light from the light source hits the reflector surface and is reflected outward to the condenser lens, the condenser lens adapted to collimate the light passing therethrough; and an opaque shield positioned between the light source and the condenser lens, the opaque shield being moveable between a first position, where a portion of the light reflected from the reflector surface is blocked from reaching the condenser lens, and a second position, where substantially all of the light reflected by the reflector surface is allowed to reach the condenser lens;

the condenser lens having a first segment and a second segment wherein when the opaque shield is in the first position, substantially all of the light from the light source is reflected only to the first segment of the condenser lens, and when the opaque shield is in the second position, light from the light source is reflected to the first and second segments of the condenser lens, wherein the first segment of the condenser lens is a lower hemi-spherical portion and the second segment of the condenser lens is an upper hemi-spherical portion, and wherein the first segment of the condenser lens has a first focal point and the second segment of the condenser lens has a second focal point, the first and second focal points being located proximal to a central axis of the headlamp assembly, between the light source and the condenser lens, the second focal point being located closer to the lens than the first focal point.

2. The headlamp assembly of claim 1, wherein the shield, when in the first position, and the first focal point are located at the same distance from the light source, such that when in the first position, the opaque shield only allows light above the first focal point to pass through to the condenser lens, thereby creating a low beam cut off.

3. The headlamp assembly of claim 2, wherein when the opaque shield is in the first position, light passing through the first segment of the condenser lens does not pass through the first focal point, and therefore is not collimated.

4. The headlamp assembly of claim 3, wherein when the opaque shield Is in the second position, light reflected from the reflector shield passes through the second focal point to the second segment of the condenser lens and is collimated, thereby creating a high intensity high beam.

5. The headlamp assembly of claim 4, wherein the light source is one of a high-intensity discharge bulb and a halogen bulb.

6. A headlamp assembly having low beam and high beam operation modes comprising:

a light source;

a reflector surface adapted to reflect light from the light source outward;

a condenser lens positioned at a distance from the light source such that light from the light source hits the reflector surface and is reflected outward to the condenser lens, the condenser lens adapted to collimate the light passing therethrough; and an opaque shield positioned between the light source and the condenser lens, the opaque shield being moveable between a first position, where a portion of the light reflected from the reflector surface is blocked from reaching the condenser lens, and a second position, where substantially all of the light reflected by the reflector surface is allowed to reach the condenser lens;

the condenser lens having a first segment and a second segment wherein when the opaque shield is in the first position, substantially all of the light from the light source is reflected only to the first segment of the condenser lens, and when the opaque shield is in the second position, light from the light source is reflected to the first and second segments of the condenser lens;

the first segment having a first focal point and the second segment having a second focal point, the first and second focal points being located proximal to a central axis of the headlamp assembly, between the light source and the condenser lens, the second focal point being located closer to the lens than the first focal point.

7. The headlamp assembly of claim 6, wherein the shield, when in the first position, and the first focal point are located at the same distance from the light source, such that when in the first position, the opaque shield only allows light above the first focal point to pass through to the condenser lens, thereby creating a low beam cut off.

8. The headlamp assembly of claim 7, wherein when the opaque shield is in the first position, light passing through the first segment of the condenser lens does not pass through the first focal point, and therefore is not collimated.

9. The headlamp assembly of claim 8, wherein when the opaque shield is in the second position, light reflected from the reflector shield passes through the second focal point to the second segment of the condenser lens and is collimated, thereby creating a high intensity high beam.

10. The headlamp assembly of claim 9, wherein the light source is one of a high-intensity discharge bulb and a halogen bulb.

11. A headlamp assembly having low beam and high beam operation modes comprising:

a light source;

a reflector surface adapted to reflect light from the light source outward;

a condenser lens positioned at a distance from the light source such that light from the light source hits the reflector surface and is reflected outward to the condenser lens, the condenser lens adapted to collimate the light passing therethrough; and an opaque shield positioned between the light source and the condenser lens, the opaque shield being moveable between a first position, where a portion of the light reflected from the reflector surface is blocked from reaching the condenser lens, and a second position, where substantially all of the light reflected by the reflector surface is allowed to reach the condenser lens;

the condenser lens having a first segment and a second segment wherein when the opaque shield is in the first position, substantially all of the light from the light source is reflected only to the first segment of the condenser lens, and when the opaque shield is in the second position, light from the light source is reflected to the first and second segments of the condenser lens, wherein the first segment of the condenser lens is a lower hemi-spherical portion and the second segment of the condenser lens is an upper hemi-spherical portion, and wherein the first segment of the condenser lens has a first shape and the second segment of the condenser lens has a second shape, the first and second shapes being different from each other.

12. The headlamp assembly of claim 11, wherein the light source is one of a high-intensity discharge bulb and a halogen bulb.

* * * * *